April 17, 1962    J. W. DISTEL    3,029,719
EXPOSURE CONTROL DEVICES
Filed Dec. 21, 1959    4 Sheets-Sheet 1

INVENTOR.
Joseph W. Distel
BY Brown and Mikulka
and
Robert J. Schiller
ATTORNEYS April 17, 1962  J. W. DISTEL  3,029,719
EXPOSURE CONTROL DEVICES
Filed Dec. 21, 1959  4 Sheets-Sheet 3

INVENTOR.
Joseph W. Distel
BY Brown and Mikulka
and
Robert J. Schiller
ATTORNEYS

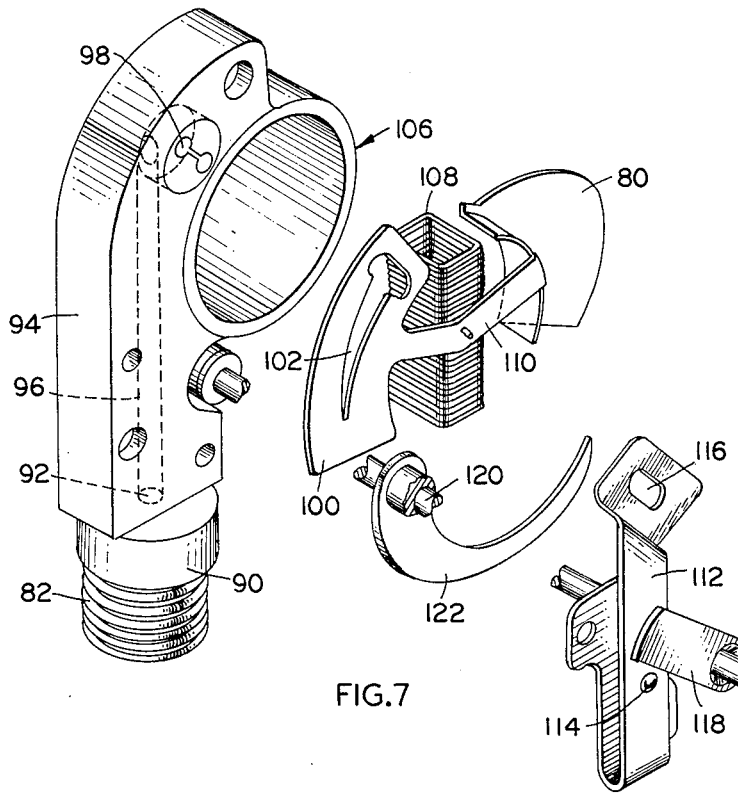
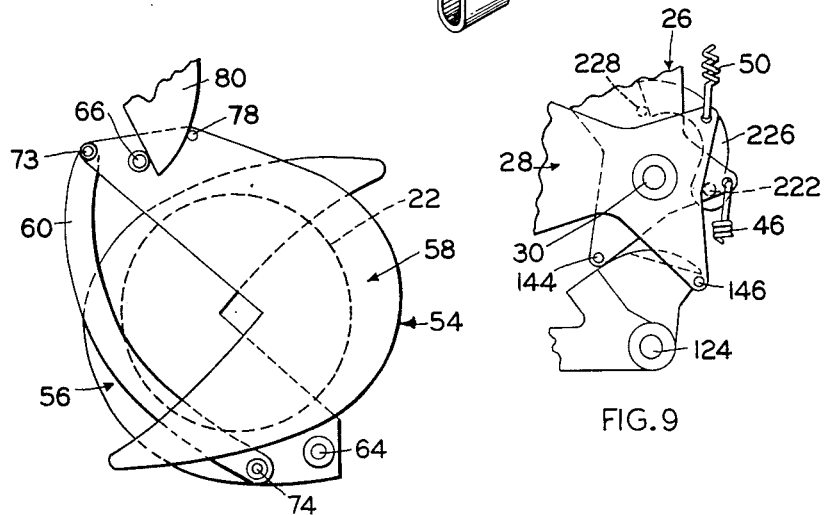
FIG.7
FIG.8
FIG.9

United States Patent Office 3,029,719
Patented Apr. 17, 1962

3,029,719
EXPOSURE CONTROL DEVICES
Joseph W. Distel, Boston, Mass., assignor to Polaroid Corporation, Cambridge, Mass., a corporation of Delaware
Filed Dec. 21, 1959, Ser. No. 860,954
14 Claims. (Cl. 95—10)

This invention relates to photography and more particularly to exposure control devices.

Among the simpler of the many known shutter mechanisms are those which possess at least one solid, opaque shutter blade; in single bladed mechanisms of this type, generally exposure is initiated by movement of the blade from an initial position of closure to a fully opened or uncovering position relative to an exposure aperture, and terminated by reverse movement of the blade. Where a shutter is multi-leaved, as for instance in the iris type of shutter, the shutter operation is broadly similar in that, simple or complex, the operation of both types of shutter requires the arrest and reversal of the direction of movement of the shutter blade or blades during exposure.

Where extremely short exposure periods, for instance intervals substantially less than $\frac{1}{1000}$ second, are desired, the inertia of the shutter blade makes meeting the criteria of arrest and reversal difficult, and renders the timekeeping accuracy of the mechanism doubtful. One solution to this problem may be found in the prior art teaching of an apparatus which includes a pair of solid shutter blades (i.e., blades without apertures or openings therein). The blades are mounted for movement in sequence such that the first blade moves from its initial covering position with respect to the aperture to an uncovering position at one side of the aperture to initiate exposure through the latter. The second blade then moves from its initial uncovering position at an opposite side of the aperture to a covering position with respect to the aperture, thus terminating exposure through the latter. It is apparent that in such a dual-element structure, the inertia of the blade or blades is not necessarily a material factor in the determination of the exposure time interval between initiation and termination. The movement of the blades in prior art structures of this type has, however, required space having one dimension in the plane of the exposure aperture which is at least thrice the diameter of the latter.

It is also known in the art that determination of exposure parameters and subsequent adjustment of a shutter mechanism in accordance therewith may be accomplished automatically by coupling photoelectric means, such as a photocell and galvanometer, to an aperture-control device or a shutter-speed control device or to both. Although exposure automation of the shutter mechanism relieves the operator of a camera with respect to some functions, it creates problems of its own. For instance, the photoelectric mechanism usually comprises a photocell, galvanometer and other elements such as thermistors, batteries, clamping or restraining mechanisms and the like. This addition of the photoelectric mechanism to the shutter substantially alters the space requirements of the shutter housing, makes the mechanism bulky and unwieldy, and often forces redesign of other portions of a camera mechanism with attendant increases in cost.

Therefore, one object of the present invention is to provide a shutter mechanism having considerable timekeeping accuracy over a wide range of exposure values, and in which mechanism the parts which move to effect exposure occupy a minimum of space yet are simple and easy to manufacture and assemble. Other objects of the present invention are to provide a shutter mechanism of the type described wherein means are provided for making an exposure by a simple sequence of operations in which a first shutter blade is moved from a covering position relative to an exposure aperture to one side of said aperture thereby initiating exposure, a second blade is moved from said one side of said aperture to a covering position with respect thereto thereby terminating exposure, and means are provided for timing the sequence of said operations; and to provide a novel shutter mechanism of the type described wherein at least one exposure parameter is established in accordance with the intensity of illumination of the field of view of the mechanism as determined by photoelectric means.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller undertanding of the nature and objects of the invention, reference should be had to be following detailed description taken in connection with the accompanying drawings wherein:

FIG. 7 is an exploded perspective schematic view of selected elements of a photoresponsive shutter speed control mechanism, partly in fragment, of the embodiment of FIGURE 1;

FIG. 8 is a schematic view of the diaphragm means of the embodiment of FIGURE 1 showing the leaves in an aperture-defining position; and FIG. 9 is a schematic view of some elements of resetting means of the embodiment of FIGURE 1 in relation to the shutter blades and timing means after exposure has been completed.

The invention concerns a novel shutter mechanism which, in its simplest embodiment, comprises a pair of shutter elements adapted for covering and uncovering an exposure aperture. One of the shutter elements is movable from covering position with respect to the aperture to an uncovering position at one side of the aperture for initiating exposure, the other of the shutter elements being normally positioned to said one side of the aperture and being movable therefrom to a covering position with respect to the aperture for terminating exposure therethrough. The invention, in a preferred embodiment, includes movable diaphragm means for defining a variable exposure aperture. The invention also includes regulating means for determining the total exposure provided by movement of the shutter elements and the diaphragm means in a sequence of operations wherein first the regulating means controls the movement of the diaphragm means so as to define a predetermined exposure aperture, then controls the movement of the one shutter element to initiate exposure by permitting passage of actinic radiation through the exposure aperture, and lastly controls the movement of the other of the shutter elements for covering the exposure aperture to terminate exposure.

In the embodiment shown, the exposure provided by the regulating means is a function of ambient illumination. Consequently, the invention also comprises means for rendering the intensity of said illumination in terms of mechanical displacements which may be employed for predetermining the exposure parameters.

Figure 1:
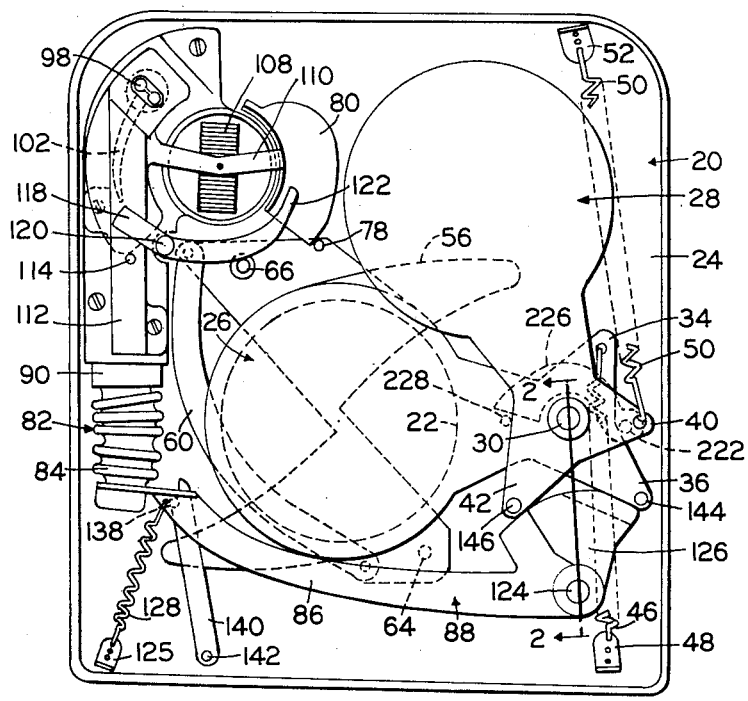
FIGURE 1 is a schematic rear elevation of some of the assembled components of an embodiment of the invention wherein said components are in rest position.

Turning now to the drawings, there is shown particularly in FIG. 1 one embodiment of the invention wherein means, such as substantially planar support plate 20, are provided upon which the operative elements of the invention may be mounted. Plate 20 includes therein an exposure aperture or opening 22 through which it is intended to selectively pass actinic radiation to effect exposure when the invention is employed in conjunction with a photosensitive material such as a well-known silver halide emulsion film, thermographic plate, photopolymerizable sheet or the like. Mounted upon one surface 24 of plate 20 adjacent opening 22 are shutter means which, in the form shown, comprises first shutter blade 26 and second shutter blade 28.

Each shutter blade is formed of a thin sheet-like material which is substantially opaque to the radiation with which the invention is intended to be employed, it being understood that support plate 20 is similarly opaque.

Figure 5:
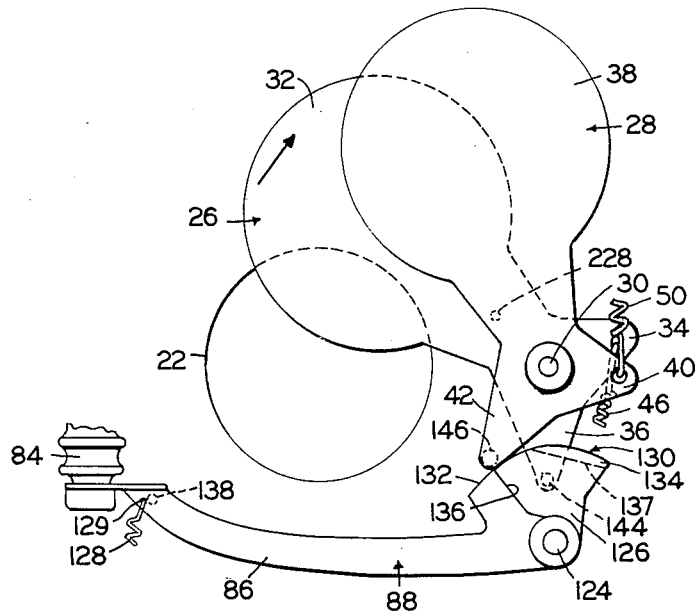
FIG. 5 is a schematic view, partly in fragment, of the shutter blades and timing means of FIGURE 1, showing the blades during exposure initiation.
Figure 6:
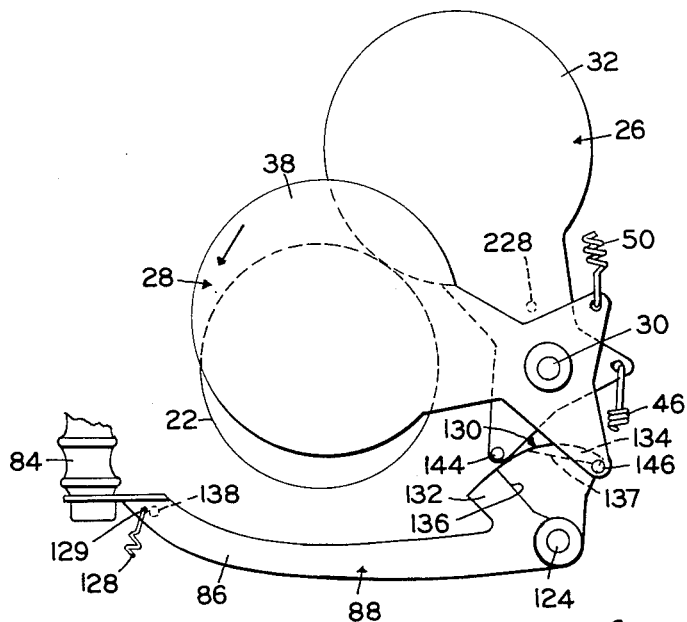
FIG. 6 is a schematic view, partly in fragment, of the elements of FIG. 5, showing the shutter blades and timing means in position during exposure-terminating movement.

As shown, particularly in FIGS. 5 and 6, blade 26 is shaped as a substantially planar, elongated member, one extremity of which comprises covering portion 32. Covering portion 32 is dimensioned so that when aligned with opening 22, the covering portion fully covers the opening to occlude actinic radiation through the latter. The opposite extremity of blade 26 is bifurcated to comprise first arm 34 and second arm 36 disposed at an angle to one another. Mounting means such as elongated post 30 are provided, blade 26 being mounted thereon intermediate covering portion 32 and arms 34 and 36 with the latter arms extending radially from the post.

Figure 2:
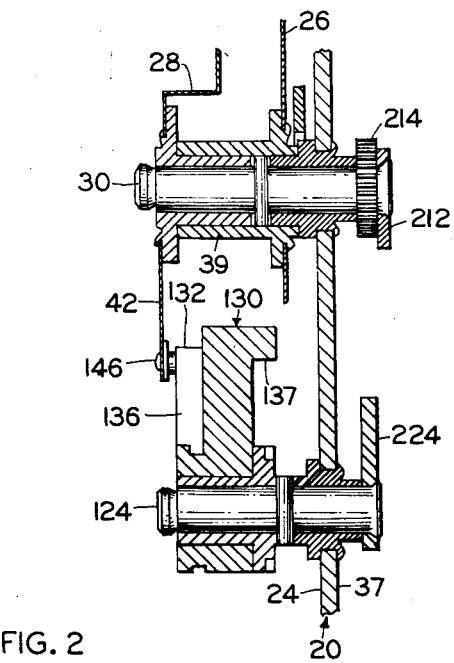
FIG. 2 is a section taken along the line 2—2 of FIGURE 1.

As may be seen in FIG. 2, post 30 is mounted on and extends through plate 20 to the opposite side or surface 37 thereof, and is freely rotatable about its long axis with respect to the plate. Blade 26 is mounted on the post by suitable means such as sleeve bearing 39 so that the blade is rotatable in its own plane independently of both post 30 and blade 28.

Blade 28 is provided with a similarly dimensioned, covering portion 38 and also includes similar arms 40 and 42, being so mounted upon post 30 intermediate the latter two arms and covering portion 38 that the arms extend substantially radially from the post. Blade 28 is mounted at one extremity of post 30 by suitable overrunning clutch means so that the blade is rotatable with rotation of post 30 in a predetermined direction, post 30 then being rotatable in the opposite direction even with blade 28 held stationary. Arms 40 and 42 are offset to lie in a plane parallel to the plane of covering portion 38, thus insuring that the rotation of blade 28 moves covering portion 38 in its own plane closely adjacent and parallel to the plane of rotation of covering portion 32. This arrangement minimizes light leakage between the blades.

Blade 26 is normally mounted so that covering portion 32 is aligned with opening 22, being therefore in a first or closed position. The blade is rotatable between the closed position and an uncovering position wherein blade 26 is disposed to one side of the opening. Blade 28 is normally mounted in uncovering position relative to opening 22 at said one side thereof, being rotatable between its uncovering position and a second position wherein it is in alignment with and therefore covers the opening. It may thus be seen that the closed and uncovering positions of the covering portions of both blades are essentially the same relative to opening 22, allowing of course for the displacement between their respective planes of movement; consequently they are in contiguous and congruent relation with one another during most of an exposure, blades 26 and 28 both being in uncovering position.

As a means for moving blade 26 from closed position to uncovering position there is provided a resilient element such as elongated spring 46 which is attached at one extremity thereof to appropriate mounting means 48 on plate 20 and at its other extremity upon a portion of first arm 34. When blade 26 is in its closed position, spring 46 is stressed to provide a bias which tends to rotate blade 26 into its uncovering position. A similar resilient means, elongated spring 50, is mounted at its respective extremities upon suitable mounting means 52 disposed on plate 20 and upon a portion of arm 40, being stressed when blade 28 is in its uncovering position to provide a bias for moving blade 28 from its uncovering position to its second position.

Referring now to FIGS. 1 and 8 of the drawings, there is shown included in the invention a diaphragm means, indicated generally by the reference numeral 54, which is preferably of the double-blade, linkage type and comprises a first or movable master leaf 56 and a second or movable slave leaf 58, the leaves being pivotally connected to one another by means such as elongated link 60. Master leaf 56 comprises an approximately planar, roughly crescent-shaped member mounted adjacent one extremity or horn upon suitable means such as elongated post 64 for rotation with the latter. Post 64, in turn, is mounted adjacent the periphery of opening 22 and upon plate 20, extending through the latter and being freely rotatable with respect thereto. Slave leaf 58 comprises a similar crescent-shaped element which is mounted adjacent one extremity or horn by suitable means such as pivot member 66. Pivot member 66 is mounted upon surface 24 and located adjacent the periphery of opening 22 at a side thereof substantially opposite from post 64.

As a means for defining an effective exposure aperture in cooperation with opening 22, the concave edge of master leaf 56 is provided with an opening or notch 68 which preferably has a V-shape such as an approximate right angle; slave leaf 58, in the form shown, includes a similar notch 70. Leaves 56 and 58 are movable between a closed position wherein they cooperatively overlap to fully cover opening 22 thereby preventing the passage of actinic radiation therethrough, and a plurality of uncovering positions wherein the notches cooperate to define a variable opening 72 which is disposed in symmetrical alignment about an axis perpendicular to the center of the plane of opening 22. Link 60, which connects the slave and master leaves for movement with one another, is pivotally connected at one extremity thereof by pivot 73 which is mounted upon the horn of leaf 58 which is adjacent pivot member 66. The other extremity of link 60 is connected by pivot 74 to that horn of leaf 56 which in turn is mounted upon pivot 64.

Figure 3:
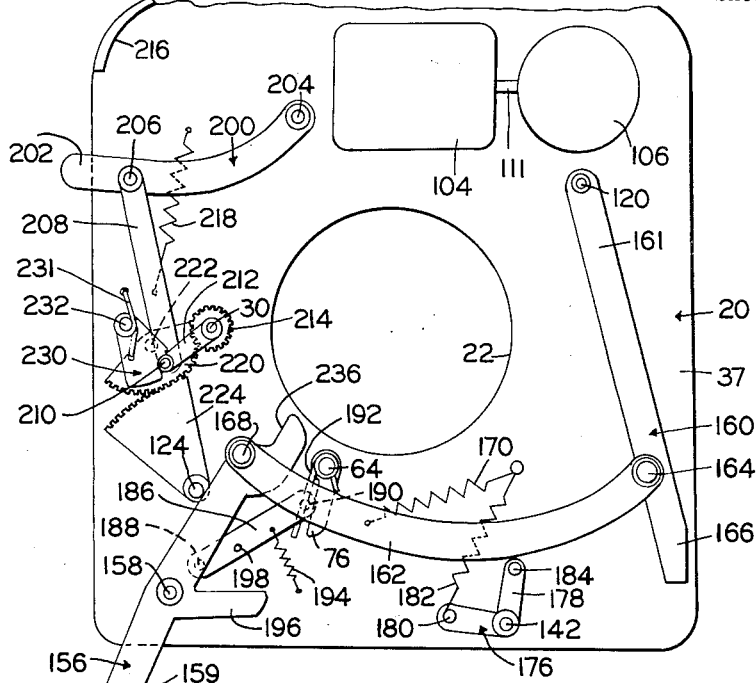
FIGURE 3 is a schematic front elevation of an assembly of the remainder of the components of the embodiment of the invention shown in FIGURE 1, the components also being a rest position.
Figure 4:
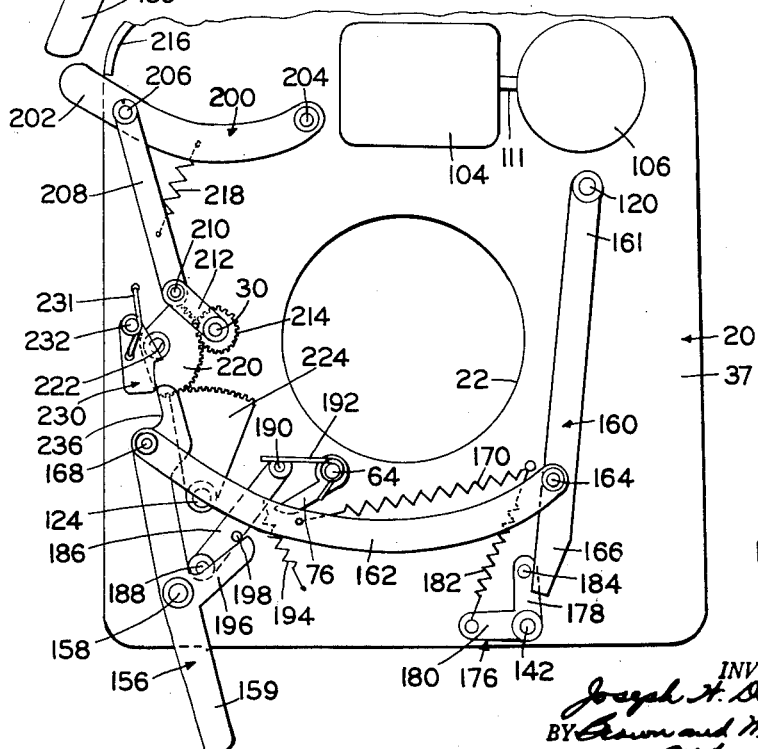
FIG. 4 is another view of the assembly of FIG. 3 showing the components in actuated position.

As may be seen in FIGS. 3 and 4, post 64 extends substantially perpendicularly to plate 20 and is joined on the opposite surface 37 of the plate from the diaphragm leaves by lever arm 76 which is affixed to the post for rotation therewith. Lever arm 76 is movable in a plane substantially perpendicular to the long axis of post 64 and therefore substantially parallel to the planes of movement of the diaphragm leaves. The mechanism thus provided comprises a means for establishing a plurality of effective exposure apertures; as lever 76, post 64, and master leaf 56 are affixed for movement with one another, and as the rotation of leaf 56 is transmitted through linkage 60 to slave leaf 58, rotation of lever 76 will cause the diaphragm leaves to move oppositely to one another to expand or contract the size of opening 72. In the embodiments shown, the slave leaf 58 is provided thereon with a cam follower such as pin 78 which is adapted to slidably engage a cam element described hereinafter.

Regulating means are provided for controlling total exposure and are shown particularly in FIGS. 1 and 7. The regulating means include setting means for controlling the magnitude or area of the effective exposure aperture provided by the cooperation of the notches with opening 22, and time-regulating means for controlling the exposure. The setting means preferably comprises cam element 80 which is engageable with pin 78 and so mounted for movement as to provide a variably positionable limit stop for arresting the rotation of the diaphragm blades in a predetermined direction.

The time-regulating means, in the form shown, comprises a deformable pneumatic device such as substantially elastic, hollow bellows 82. The bellows is preferably formed with a first or movable extremity 84 which is connected directly to the extremity of arm 86 of timing element 88 and is movable therewith. Bellows 82 is also provided with a second or fixed extremity 90 having an opening 92 therein through which a fluid or gas may flow in and out of the interior of the bellows. As a means for providing an anchor for the fixed extremity of the bellows and for providing a passageway to a fluid-flow controlling means, the embodiment shown includes a valve block 94 having a tubular passageway 96 therein, the valve block being mounted by suitable means upon surface 24 of plate 20. One end of passageway 96 is joined to opening 92 in the bellows, preferably by a leakproof junction, the other end of passageway 96 terminating at a surface of valve block 94 to provide an opening or valve aperture 98.

For controlling the rate of movement of a fluid or gas in and out of bellows 82 by way of passageway 96 and valve aperture 98, and thereby controlling the time rate of elastic deformation of the bellows, a movable valve element such as substantially planar valve plate 100 is provided. The valve plate includes therein an arcuate opening 102 which is variable in width from one extremity to the other. Plate 100 is so mounted for rotation that opening 102 is movable closely adjacent to and across valve aperture 98 for varying the effective area of aperture 98 through which a fluid or gaseous medium may pass. Opening 102 may be so dimensioned as to permit flow in cooperation with and through aperture 98 between a maximum rate determined by the full area of aperture 98 and a minimum rate determined by the limitations upon the area of aperture 98 imposed by the narrowest portion of arcuate opening 102. Other valve means known in the art may be employed in place of plate 100 although the particular construction shown herein is preferred for its simplicity, lightness and ease of operation. Additionally, it should be noted that other means known in the art for establishing time intervals may be employed in place of a pneumatic device.

Although exposure control can be provided by manual setting of the regulating means, in the form of the invention shown the regulating means provides exposure control responsively to the electrical signal output of photoelectric means such as cell 104 (shown schematically in FIGS. 3 and 4), which output is a function of the intensity of light incident thereon. It is understood that photoelectric cell 104 may be photovoltaic, photoconductive or the like. As a means for translating these electrical signals into mechanical displacements, there is provided an electrodynamic device such as galvanometer 106 having a rotatable coil 108 and an indicating means, such as needle 110, mounted upon a coil for rotation therewith. Appropriate means, such as leads 111, are provided for feeding the signals from the cell to the galvanometer. The galvanometer is preferably of the type, well known in the art, wherein coil 108 and needle 110 assume an angular equilibrium position responsively to the intensity of the electrical signals produced by the photocell. As shown in the drawings, galvanometer 106 is mounted upon plate 20 in a substantially fixed relation thereto; however, in order to compensate for variables such as different film speeds of photographic films employed in cameras used with the invention, or the variations in density of filters which may be placed across opening 22, galvanometer 106 may be mounted upon a backing plate for rotation with respect thereto. Needle 110 and coil 108 comprise means for moving cam element 80, the latter being mounted on needle 110 for movement therewith. The shape of the surface of cam element 80 which is engageable with pin 78 controls, in conjunction with the position of element 80, the position of the diaphragm leaves and therefore the aperture-defining relation of notches 68 and 70 with opening 22. The aperture thus determined by the diaphragm leaves responsively to the position and configuration of cam element 80 is a function of the ambient illumination represented by the angular position of the galvanometer coil. The aperture control attained through shaping of cam element 80 provides a predetermined relationship which is, for instance, such that the area of opening 72 bears a log-linear relation to the intensity of ambient illumination determined by the photocell.

Needle 110 and coil 108 also comprise means for moving valve plate 100 in rotation across valve aperture 98, plate 100 being mounted on needle 110 for movement therewith and, of course, for movement in fixed relation to cam element 80. It may therefore be seen that the rate of elastic deformation of the bellows is a function of the ambient illumination and bears a predetermined relation to the effective exposure aperture.

Inasmuch as coil 108 and associated needle 110 are preferably mounted for easy rotation and are therefore sensitive to vibration or other physical forces external to the invention which would disturb the equilibrium position thereof, it is desirable to provide means for releasably retaining the needle in a stationary position at least during exposure operation of the invention. Additionally, as cam element 80 is adapted to engage pin 78 to establish an effective exposure aperture in accordance with the equilibrium position of coil 108, it is preferred that needle 110 be held in a substantially stationary position at least during exposure through the aperture. Further, retaining or clamping the needle in a stationary position allows one to operate the mechanism so as to preset both the exposure time interval and effective exposure aperture prior to exposure operation of the mechanism.

As shown particularly in FIG. 7, there is provided means for releasably retaining valve plate 100 in a substantially stationary position, which means is in the form of flat, resilient, elongated clamping member 112. One extremity of member 112 is mounted, for instance, upon valve block 94 and the member extends therefrom such that a portion thereof is normally positioned substantially parallel with the plane of movement of valve plate 100 and closely adjacent thereto, valve plate 100 being movable between member 112 and block 94. Clamping member 112 includes thereon a raised cam portion 114 which extends from the plane of the clamping member on the opposite side of the latter from the valve plate. The clamping member also includes, adjacent its unanchored extremity, opening 116 which is aligned with both valve aperture 98 and arcuate opening 102 in the valve plate. Means are provided for moving clamping member 112 in and out of engagement with valve plate 100 and, in the form shown, comprises locking lever 118 mounted upon post 120 for rotation therewith. Locking lever 118 is rotatable in and out of sliding engagement with cam portion 114 such that upon engagement of the lever arm with the cam portion, the clamping member is resiliently deformed into engagement with the valve plate and locks the valve plate between the unmounted extremity of the clamping member and the valve block. Post 120 is mounted on support plate 20 and extends therethrough, being freely rotatable with respect to plate 20.

As a means for releasably retaining cam element 80, there is provided arcuate lever 122 which is so mounted on post 120 that, as the post rotates to clamp cam portion 114, lever 122 is brought into engagement with a portion of cam element 80, thereby arresting the latter by clamping it against the external periphery of galvanometer 106. Lever 122 is preferably mounted on post 120 by overrunning clutch means so that post 120 may continue its rotation even after the lever is in engagement with the cam element. The arrangement of parts provides that the engagement of locking lever 118 with cam portion 114 and the clamping of cam element 80 occur as substantially the same time.

The time-regulating means also includes timing means such as element 88 which is mounted, as shown particularly in FIGS. 5 and 6, on support plate 20 for rotation with respect thereto about suitable mounting means such as post 124 which is mounted on plate 20 so as to extend therethrough and to be freely rotatable about its long axis relative to the plate. Element 88 is affixed to one extremity of post 124 for rotation therewith by known overrunning clutch means so that rotation of the post through a limited arc in only one direction is accompanied by rotation of element 88. Timing element 88 is provided with an arm 86 extending substantially radially from mounting means 124 and being directly connected adjacent its radial extremity to movable extremity 84 of the bellows. As a means for rotating the timing element there is provided a resilient element such as elongated spring 128, one end of which is anchored at a portion of arm 86 intermediate mounting means 124 and bellows 84 as at 129, the other end of spring 128 being anchored upon anchoring device 125. Spring 128 is disposed for biasing the timing element for rotation against the retarding effect of the bellows during, in the form shown, the bellows deformation in expansion.

Timing element 88 is also provided with a movable cam portion 126 extending substantially radially from mounting means 124 and at an angle to arm 86. At its radial extremity, cam portion 126 is provided with an extending cam surface 130. In the embodiment shown in FIGS. 2, 5 and 6, surface 130 is shaped in a simple curve having a constant radius of curvature, the center of curvature being at bearing means 124. Surface 130 comprises a first section 132 and a second section 134. First section 132 includes a predetermined arcuate portion of surface 130 which is bounded at one end with an abrupt declivity or discontinuity 136 which extends radially of mounting means 124. Second section 134 includes another arcuate portion of surface 130 which is movable in a path parallel to the path of movement of section 132 and which is located at an angularly displaced position relative to section 132. Second section 134 also includes undercut 137 which determines the arcuate limits of the section.

Timing element 88 is rotatable under the bias of spring 128 from a first position, wherein spring 128 is stressed to provide maximum tension and bellows 82 is in a collapsed position wherein the interior air space is at a predetermined minimum, to a second position wherein the bellows has been expanded to its fullest extent and permits of no further rotation of the timing element. The speed of movement of the timing element from its first to its second position is variable in accordance with the flow of air into the bellows as determined by the position of valve plate 100.

As a means for releasably retaining the timing element in its first position, the timing element is provided with an engageable portion or pin 138 mounted on arm 86 intermediate bearing means 124 and the radial extremity of the arm. The means for releasably retaining the timing element in its first position also includes a latching element 140 mounted upon post 142 for rotation therewith in and out of engagement with pin 138. Post 142 in turn is mounted upon plate 20 and extends therethrough, being rotatable freely with respect to the backing plate.

Second arm 36 of shutter blade 26 is provided adjacent its radial extremity with a cam follower or stud 144 which extends substantially perpendicularly to the plane of blade 26. Stud 144 is so located on arm 36 that when timing element 88 is in its first position and shutter blade 26 is in its fully closed position, the stud is in slidable engagement with second section 134 of surface 130 of the timing element. It will therefore be seen that stud 144 and surface 130 comprise means for releasably retaining shutter blade 26 in its closed position.

Similarly, arm 42 of shutter blade 28 is provided adjacent its radial extremity with a cam follower such as stud 146 which extends substantially perpendicularly to the plane of arms 42 and 40. Stud 146 is so located on arm 42 that when the timing element is in its first position and blade 28 is in its uncovering position, stud 146 is in slidable engagement with first section 132 of surface 130, the latter surface and stud 146 therefore comprising means for releasably retaining shutter blade 28 in its uncovering position.

When studs 144 and 146 are in engagement with sections 134 and 132, respectively, of surface 130, corresponding springs 46 and 50 are stressed for exerting predetermined maximum biases to rotate the blades. Stud 144 and section 134 are dimensioned to provide the release or drop-off of stud 144 from section 134 following a predetermined angular rotation of the timing element from its first position. Following the drop-off of stud 144, it will be seen that blade 26 is free to rotate rapidly from its closed to its uncovering position under the bias of spring 46. Similarly, stud 146 and section 132 of surface 130 are so dimensioned that after a predetermined angular rotation of timing element 88, stud 146 is released allowing shutter blade 28 freedom to rotate rapidly to its fully closed position under the bias imposed by spring 50. In the preferred embodiment, the arrangement of studs 144 and 146 and surface 130 provides that upon rotation of the timing element from its first position the studs are released in a sequence whereby first shutter blade 26 is free to move to its uncovering position and then shutter blade 28 is free to rotate to closed position.

The space required within a housing for a shutter mechanism is determined, in a large measure, by the size of the shutter blades and in the space within which the blades are adapted to move. The blades of the present invention require an area of movement, the maximum length of which is two-blade "diameters" (i.e. the distance across the covering portion of a blade) and the maximum width of which is substantially the radial dimension of a blade from its mounting means. As therefore may be seen, the invention provides a shutter mechanism, the space requirements of which are minimal. For example, a shutter mechanism has been constructed according to the teaching embodied herein having a maximum exposure aperture adapted to accommodate an f4.7 lens, a photoconductive cell, a mercury battery, and a pneumatic control system; the total structure is so compact that its dimensions closely approximate a standard "Prontor"-type shutter utilizing a similar f4.7 lens, even though the latter does not include the cell, battery, and control system and is therefore not photoresponsive.

The invention also includes means for actuating the clamping members, shutter means and diaphragm means. In the form shown in FIGS. 3 and 4, the actuating means comprises a linkage system, disposed on the opposite surface 37 of plate 20 from the shutter and diaghragm means. The linkage system includes an element such as elongated actuating lever 156 which is mounted intermediate its extremities upon the backing plate for rotation with respect thereto about suitable bearing means 158. Actuating lever 156 is mounted with one extremity 159 extending beyond the periphery of the backing plate so as to be manually engageable by an operator of the mechanism for rotating the bell crank about bearing means 158. The linkage system also includes second elongated lever 160, one extremity 161 of which is attached to the end of post 120 which extends through to this side of the support plate, second lever 160 and post 120 being fixed for rotation together. The linkage system also includes an elongated arcuate member such as link 162. One end of link 162 is pivotally mounted as at 164 adjacent extremity 166 of second lever 160 furthest removed from post 120. The other end of link 162 is also pivotally mounted as at 168 adjacent the end of lever 156 furthest from extremity 159.

Upon counterclockwise rotation of actuating lever 156 by an operator, the entire linkage system is movable between a first or rest position and a second or displaced position. When the linkage system is in rest position, locking lever 118 and lever 122, both attached to post 120 for rotation therewith, are respectively out of engagement with cam portion 114 and cam element 80. In order to bias the linkage system into this rest position, resilient means such as elongated spring 170 are provided, being attached at its ends respectively upon a portion of plate 20 and upon intermediate portion 172 of link 162.

The actuating means also includes means, such as element 176, for moving post 142 and therefore for moving element 140 in and out of engagement with pin 138. Element 176 is in the form of a bell crank having two arms 178 and 180 disposed at an angle to one another, element 176 being mounted adjacent the junction of arms 178 and 180 upon post 142 for rotation therewith. Means are provided in the form of an elongated spring 182, for biasing element 176 for rotation so that latching element 140 is therefore biased into engagement with pin 138. Spring 182 is attached at one extremity to backing plate 20 and at the other extremity to a portion of arm 180. Arm 178 is provided thereon with an upstanding portion such as pin 184 which extends into the path of rotation of extremity 166 of lever 160.

The actuating system further includes an elongated member 186 which is mounted at one extremity thereof for rotation upon surface 37 of the support plate by pivot 188. The other extremity of member 186 includes an upstanding portion or pin 190. Resilient means such as elongated hairpin spring 192 is provided for coupling member 186 with lever arm 76 so that the coupling therebetween is compliant. Resilient means such as elongated spring 194 is provided with one extremity attached to an intermediate portion of member 186 and the other extremity mounted upon support plate 20 for urging pin 190 into releasable engagement with lever arm 76.

Lever 156 is provided with finger 196 which extends at an angle from the long dimension of the lever and substantially radially of bearing means 158. Member 186 is provided intermediate its extremities with an upstanding portion or pin 198 which is so dimensioned as to extend into the path of movement of finger 196 during rotation of lever 156 from its rest position.

The parts of the invention thus far described operate in the following manner:

Electrical signals are produced by photoelectric cell 104 in accordance with the intensity of the radiation intended to be passed through the exposure aperture of the invention to effect an exposure. The signals are trasnmitted though leads 111 to galvanometer 106, and in response to these signals, coil 108 assumes a position of equilibrium, needle 110 being moved correspondingly with the coil. The movement of needle 110 rotates valve plate 100 so that opening 102 is rotated across valve aperture 98 to provide an effective area for the passage of air through the valve aperture, the size of the effective area corresponding to the magnitude of the radiation intensity. Cam element 80 likewise moves to a position corresponding to the equilibrium position of coil 108.

The operator, to actuate the mechanism, grasps extremity 159 and, by exerting pressure thereagainst, rotates actuating lever 156 in a counterclockwise direction, as shown in FIG. 3, about bearing means 158. Because of the linked connection, the initial rotation of lever 156 moves second lever 160 and causes post 120 to rotate. The rotation of post 120 moves lever 118 and lever 122 respectively into engagement with cam portion 114 and cam element 80, thereby releasably locking needle 110 and coil 108 in a substantially stationary position as determined by the signals received by the galvanometer substantially at the instant of the initial rotation of lever 156 by the operator.

Further rotation of lever 156 by the operator brings finger 196 into engagement with pin 198, forcing element 186 to rotate about pivot 188 against the bias of spring 194. The rotation of element 186 tends to move pin 190 away from its position adjacent lever 176, thereby stressing spring 192 and causing lever arm 76 to rotate about post 64.

Diaphragm leaves 56 and 58, being coupled through link 60 for rotation in opposite directions, therefore tend to move from their fully covered position with respect to opening 22 upon the rotation of post 64. This movement of the leaves is arrested at a position determined by the engagement of pin 78 with now stationary cam element 80, the magnitude of the effective exposure aperture defined by the cooperation of opening 22 with notches 68 and 70 being a function of the position of cam element 80 such as is shown in FIG. 8. Thus, the effective exposure aperture or stop of the invention is automatically predetermined in accordance with the electrical signals received by the galvanometer.

When element 176 is in a position wherein coupled latching element 140 is in engagement with pin 138, rotation of lever 160 through a predetermined angle from its rest position brings extremity 166 into engagement with pin 184. Continued rotation of lever 160 moves element 176 against the bias of spring 182, thereby rotating latching element 140 out of engagement with pin 138.

The release of latching element 140 from pin 138 permits timing element 88 to rotate under the bias of spring 128 from the first position of the timing element. The rotation of timing element 88 tends to expand bellows 82 from its collapsed position, thereby causing an attenuation of the air in the bellows, thus creating a retarding force acting against the rotating bias of spring 128. The retarding force exerted by the bellows is variable in accordance with the rate of flow of air into the bellows, which rate is a function of the effective aperture provided by the combination of opening 102 and aperture 98 in accordance with the equilibrium position of the galvanometer coil. Consequently, the speed of rotation of timing element 88 is controlled in accordance with the electrical signals received by the galvanometer. As timing element 88 rotates from its first position, surface 130 moves relative to studs 144 and 146 and, after a predetermined rotation, releases stud 144 and, after an additional rotation, releases stud 146.

In the form shown, the interior space of bellows 82 is reduced to a predetermined minimum and not eliminated when the bellows is in a collapsed position. Consequently, when the working medium is a gas such as air, for an initial angular rotation of timing element 88 there is no retarding effect upon the timing element until the air is sufficiently attenuated. This permits the timing element to accelerate rapidly during the initial moment following release, regardless of the position of valve plate 100. Consequently, this provides a means for minimizing the time-to-open interval between release of the timing element and the drop-off of stud 144. Of course, stud 144 may be so located relative to the edge where undercut 137 meets second section 134 that the time-to-open interval is minimized by the geometry of the system. Thus, the working medium may also be liquid; in such event, while the initial acceleration of element 88 is not as fast as in the case of a gaseous medium, the timing between drop-off of both studs has a somewhat smaller margin of error.

With the release of stud 144, shutter blade 26 rotates rapidly from its closed position toward its open position (as shown in FIG. 5) under the impetus provided by spring 46, thereby initiating exposure through the effective exposure provided by the cooperation of the diaphragm leaves and opening 22. The speed of rotation of the blade is dependent upon the force provided by spring 46. By minimizing the inertia of the blade and providing a strong spring, the blade speed can be readily made so high that the aperture, for instance of approximately f/70, may be uncovered in less than $5 \times 10^{-4}$ seconds.

Upon the drop-off of stud 146, shutter blade 28 is rotated rapidly under the bias of spring 50 from its open position toward closed position (as shown in FIG. 6), thereby abruptly terminating the exposure. The speed with which blade 28 is driven into closed position depends upon the inertia of the blade which is preferably low, and the strength of spring 50; closing speeds may be obtained easily such that an f/70 aperture, for instance, is covered within $5 \times 10^{-4}$ seconds by proper choice of values for these elements. The time interval of the exposure is thus determined by the speed of rotation of timing element 88 between the drop-off of studs 144 and 146, and consequently is a function of the electrical signals received by the galvanometer responsively to determination of the level of ambient illumination by a photocell.

Following rotation of element 176, release by the operator of extremity 159 allows the linkage system to return to its rest position under the bias of spring 170, and permits the return movement of all of the other elements under the biases imposed by the various springs or as reset by means described hereinafter.

Means are provided for resetting portions of the mechanism and for stressing various springs. In the form shown in FIGS. 3, 4 and 9, this means comprises a cocking lever 200 which is shaped as an arcuate, elongated element having one extremity 202 extending outwardly beyond the periphery of plate 20 so as to be readily grasped by an operator of the device. The other extremity of lever 200 is pivotally mounted upon surface 37 of the plate by suitable pivot means 204. Pivotally mounted by pivot 206 upon an intermediate portion of lever 200 and movable with the lever, is one extremity of an elongated element such as connecting link 208. The other extremity of connecting link 208 is connected by pivot means such as pin 210 to one end of lever 212. The other end of lever 212 is connected to and movable in rotation with gear 214. Gear 214, in turn, is mounted on the extremity of post 30 which extends through plate 20 to side 37, the gear and post being affixed for rotation with one another.

The mechanism thus provided by lever 200, link 208, lever 212, and gear 214 comprises a means whereby rotation of lever 200 by an operator rotates post 30 to return blade 28 from its closed to its open position. Lever 200 is rotatable from a rest to a displaced position, the rest position being defined by the releasable engagement of the lever against a limit stop provided by portion 216 of an edge of plate 20. Lever 200 is biased into this engagement by resilient means such as elongated spring 218, the ends of the latter being connected respectively to plate 20 and to an intermediate portion of link 208.

The resetting means also includes means for moving blade 26 from uncovering to covering position. The latter means includes first gear segment 220 which is mounted for rotation about post 222 in meshing engagement with gear 214. Post 222 extends substantially perpendicularly to plate 20, extending through and being freely rotatable with respect to the latter. Mounted upon post 222 adjacent surface 24 is arcuate resetting lever 226 which is also affixed to the post for rotation therewith. Blade 26 is provided with an upstanding portion or pin 228 mounted upon a portion of the blade intermediate post 30 and covering portion 32. Lever 226 and pin 228 are so disposed as to be engageable with one another throughout the entire arc of movement of blade 26 between its uncovering and covering positions.

The resetting means also includes means for moving timing element 88 from its second position to its first position. This means comprises second gear segment 224 which is affixed to that extremity of post 124 which extends through plate 20 to surface 37, gear segment 224 being rotatable therewith while being also in meshing engagement with first gear segment 220.

Means are provided for releasably locking the entire resetting system into "set" or displaced position, and includes locking element 230 which is mounted upon surface 37 and is biased by spring 231 for rotation about suitable means such as pivot 232. When the resetting means is in "set" position, spring 218 is fully stressed, and pin 210, which extends substantially normally of the plane of movement of lever 212, is in engagement with a locking portion such as notch 234 of element 224. Lever 156 includes at the extremity thereof furthest from extremity 159 an engaging portion or nose 236. Element 230 and nose 236 are so located relative to one another that the nose is engageable with a portion of element 230 for rotating the latter about pivot 232 during a predetermined portion of the counterclockwise rotation of actuating lever 156.

Briefly, recapitulating the operation of the invention, exposure is achieved through a sequence of operations wherein first the galvanometer coil is clamped at a predetermined position, then the diaphragm leaves are rotated until arrested at a position predetermined by the galvanometer, and lastly the timing element is released so as to sequentially free the shutter blades for movement. However, before the timing element is released as the result of the engagement of extremity 166 with pin 184, nose 236 engages element 230, rotating the latter out of engagement with pin 210 and freeing the resetting means, as a whole, for movement to its rest position under the bias of spring 218. This insures, for instance, that resetting lever 226 is moved out of the path of movement of pin 228 during movement of blade 26 from covering to uncovering position, and that the various overrunning clutch means are moved to positions wherein reverse rotation of the respective posts will pick up rotating elements mounted thereon to reset them.

To reset the mechanism, an operator need only grasp extremity 202 of cocking lever 200 and force the cocking lever from its rest position against the bias of spring 218. Through the motion of pivotally attached link 208 and lever 212, gear 214 and post 30 are rotated. This rotation of post 30 is transmitted through the overrunning clutch means to blade 28, thereby returning the latter to uncovering or set position and stressing spring 50. The rotation of gear 214 also rotates first gear segment 220, which latter rotation is accompanied by rotation of lever 226. This rotation of lever 226 causes the lever to engage pin 228, rotating blade 26 to its covering or set position and stressing spring 46. The rotation of first gear segment 220 also causes meshed gear segment 224 to rotate, turning post 124. This motion of post 124 is transmitted through appropriate overrunning clutch means to timing element 88, compressing bellows 82 and moving the timing element until pin 138 is engaged by latching element 140. Continuation of rotation of cocking lever 200 against spring 218 moves pin 210 into a position wherein the latter is engaged by notch 234 and the entire resetting means is locked.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A shutter mechanism comprising, in combination, means providing an exposure aperture; a first shutter blade mounted for movement from a covering position wholly across said exposure aperture, wherein said first shutter blade occludes passage of radiation, to an uncovering position wholly to one side of said aperture for initiating exposure through the latter; a second shutter blade mounted for movement from an uncovering position, wherein said second shutter blade is substantially congruent with the uncovering position of said first blade, to a covering position wholly across said exposure aperture, wherein said second shutter blade occludes passage of radiation; and means for moving in sequence said first shutter blade so as to fully uncover said aperture and said second shutter blade so as to fully cover said aperture, thereby effecting an exposure through said aperture.

2. A shutter mechanism as defined in claim 1 including means for controlling the time interval between sequential movement of said first shutter blade to said uncovering position and of second shutter blade to said covering position.

3. A shutter mechanism comprising, in combination, support means including an exposure aperture, a first solid shutter blade normally mounted on said support means in covering position across said aperture and being movable from said covering position to an uncovering position with respect to said aperture for initiating exposure through the latter, said first shutter blade being wholly disposed to one side of said aperture when in said uncovering position, means for moving said first shutter blade from said covering position to said uncovering position, a second solid shutter blade normally mounted in an uncovering position relative to said aperture wholly to said one side thereof, wherein said second shutter blade is substantially congruent with the uncovering position of said first blade and movable from its uncovering position to a covering position across said aperture for terminating said exposure, means for moving said second shutter blade from its uncovering position to covering position, and timing means for controlling the time interval between movement of said first shutter blade for initiating exposure and movement of said second shutter blade for terminating exposure.

4. A shutter mechanism comprising, in combination, means including an exposure opening, a first movable solid shutter blade normally disposed in covering position across said exposure opening, means for biasing said first shutter blade for movement from said covering position toward an uncovering position for initiating exposure, said first shutter blade being disposed in a predetermined location wholly to one side of said opening when in said uncovering position, a second movable solid shutter blade normally disposed in uncovering position relative to said exposure opening congruent with said predetermined location at said one side of said opening, means for biasing said second shutter blade for movement from its uncovering position toward a covering position wherein said second shutter blade fully covers said exposure opening so as to terminate said exposure, said covering position of said second shutter blade being substantially congruent with the covering position of said first shutter blade, and means for initiating said movements of said first shutter blade and said second shutter blade respectively in sequence.

5. A shutter mechanism as defined in claim 4 including means for controlling the time interval between initiation and termination of said exposure.

6. A shutter mechanism for effecting exposures through an exposure aperture, said mechanism comprising, in combination, a first solid shutter blade normally mounted in covering position across said aperture and being movable from said covering position to an aperture-uncovering position for initiating exposure through said aperture, said first shutter blade being disposed wholly to one side of said aperture when in said uncovering position, means for moving said first shutter blade from said covering position to said aperture-uncovering position, a second solid shutter blade normally mounted in an uncovering position wherein said second shutter blade is also wholly disposed to said one side of said aperture congruently with said aperture-uncovering position of said first blade, said second shutter blade being movable from its uncovering position to an aperture-covering position for terminating said exposure, means for moving said second shutter blade from its uncovering position to its aperture-covering position, and means having a portion thereof in releasable engagement with a respective portion of each of said shutter blades for so controlling the movement of said first shutter blade for initiating exposure and the movement of said second shutter blade for terminating exposure that said movements occur in predeterminedly timed sequence.

7. A shutter mechanism as defined in claim 6 including photoelectric means having an electrical output in accordance with ambient illumination, said means for controlling being electrically coupled with said photoelectric means for predetermining the time interval of said sequence.

8. A shutter mechanism comprising, in combination, a shutter housing having an exposure aperture therein, a first shutter blade mounted on said housing for rotation between a first position wherein said blade completely covers said exposure aperture and a second position at one side of said aperture wherein said blade completely uncovers said aperture, a second shutter blade mounted on said housing for rotation between an uncovering position wherein said second shutter blade is disposed congruently with said second position of said first blade and a closed position wherein said shutter blade completely covers said aperture, said first shutter blade being normally in said first position and said second shutter blade being normally in said uncovered position, first resilient means for moving said first blade from said first position to said second position, second resilient means for moving said second blade from said uncovered position to said closed position, cam means mounted on said housing for movement between a set position and a released position, said first blade having an engageable portion thereof normally in engagement with said cam means when the latter is in said set position for releasably retaining said first blade in said first position, said second blade having an engageable portion thereof normally in engagement with said cam means when the latter is in said set position for releasably retaining said second blade in said uncovered position, means for moving said cam means from said set position to said released position, said engageable portions of said first blade and then said second blade being respectively and sequentially disengaged from said cam means during movement of the latter from said set position to said released position, the time interval of the sequence of disengagement being a function of the speed of movement of said cam means.

9. A shutter mechanism as defined in claim 8 including speed control means coupled with said cam means for controlling the speed of the latter to variably determine said time interval.

10. A shutter mechanism as defined in claim 9 including photoelectric means having an electrical output in accordance with ambient illumination, said speed control means being electrically coupled with and responsive to said electrical output for regulating the determination of said time interval in accordance with said ambient illumination.

11. A shutter mechanism comprising, in combination, support means including an exposure aperture, a first shutter blade normally mounted on said support means in a first position wherein said blade covers said aperture and being rotatable substantially in a first plane from said first position to a second position wherein said blade uncovers said aperture, said first blade being disposed to one side of said aperture when in said second position, means for rotating said first shutter blade from said first position to said second position for initiating exposure through said aperture, a second shutter blade coaxially mounted with respect to said first shutter blade for rotation in a second plane substantially parallel and adjacent said first plane between an uncovering position to said one side of said aperture and an aperture-covering position, said first blade when in said second position and said second blade when in said uncovering position being contiguous and congruent with one another, and means for moving said second shutter blade from its uncovering position to its covering position for terminating said exposure.

12. A shutter mechanism as defined in claim 11 including means for controlling the time interval between movement of said first shutter blade for initiating exposure and movement of said second blade for terminating exposure.

13. A shutter mechanism as defined in claim 12 wherein said means for controlling the time interval comprises cam means mounted for movement between a set position and a released position, and wherein said first blade of said shutter mechanism includes an engageable portion normally in engagement with said cam means when the latter is in said set position for releasably retaining said first blade in said first position, said second blade having an engageable portion thereof normally in engagement with said cam means when the latter is in said set position for releasably retaining said second blade in said uncovering position, and means for moving said cam means from said set position to said released position, said cam means being sequentially disengaged from said engageable portions of first said first blade and then said second blade during movement of said cam means, the time interval between the sequential disengagement of said engageable portions being a function of the speed of said movement of said cam means.

14. A shutter mechanism as defined in claim 13 including photoelectric means having an electrical output in accordance with ambient illumination, and retarding means electrically coupled with said photoelectric means and mechanically coupled with said cam means for determining the speed of movement of the latter responsively to said illumination.

References Cited in the file of this patent

UNITED STATES PATENTS

| | | |
|---|---|---|
| 1,867,109 | Seifert | July 12, 1932 |
| 2,179,717 | Fedotoff | Nov. 14, 1939 |
| 2,179,718 | Fedotoff | Nov. 14, 1939 |
| 2,463,206 | Robertson | Mar. 1, 1949 |
| 2,577,774 | Lee | Dec. 11, 1951 |
| 2,621,570 | Kesel | Dec. 16, 1952 |
| 2,691,331 | Wilcox | Oct. 12, 1954 |
| 2,856,831 | Gipe | Oct. 21, 1958 |